United States Patent [19]

Cameron

[11] Patent Number: 4,815,075
[45] Date of Patent: Mar. 21, 1989

[54] MODULAR CONTIGUOUS CHANNEL MULTIPLEXER

[75] Inventor: Richard J. Cameron, High Wycombe, England

[73] Assignee: Com Dev Ltd., Cambridge, Canada

[21] Appl. No.: 21,908

[22] Filed: Mar. 4, 1987

[30] Foreign Application Priority Data

Apr. 9, 1986 [CA] Canada .................................. 506262

[51] Int. Cl.$^4$ .............................................. H04J 1/08
[52] U.S. Cl. ................................................. 370/123
[58] Field of Search .................... 370/123, 69.1, 72

[56] References Cited

U.S. PATENT DOCUMENTS

4,029,902  6/1977  Bell, Jr. et al. ..................... 370/123
4,258,435  3/1981  Levy et al. ............................ 370/72

*Primary Examiner*—Douglas W. Olms
*Assistant Examiner*—Min Jung Kim
*Attorney, Agent, or Firm*—Daryl W. Schnurr

[57] ABSTRACT

This invention relates to a modular contiguous channel multiplexer having one or more modules that produce an asymmetric filter function that is combined with responses from other modules to produce an overall symmetrical response. The multiplexer can have channels arranged in any order of relative frequencies and one or more channels can be added or removed from the multiplexer without disturbing the operation of the existing or remaining channels. A method of constructing a multiplexer involves choosing the most downstream channel first, then choosing sequentially the channel immediately upstream from the channel last chosen and choosing filters of each channel to meet certain criteria. The filters of each channel are identical to one another but are not necessarily identical to filters in adjacent channels.

25 Claims, 8 Drawing Sheets

PRIOR ART

FIGURE 5

PRIOR ART

MODULAR CONTIGUOUS CHANNEL MULTIPLEXER

BACKGROUND OF THE INVENTION

1. FIELD OF THE INVENTION

This invention relates to a microwave frequency channel combining apparatus, commonly referred to as a multiplexer and to a method of constructing such a multiplexer. In particular, this invention relates to a modular contiguous channel multiplexer that provides complete flexibility in that any number of channels can be contiguously combined in any preferred order of relative frequencies and any number of channels can be added at any future time without affecting the performance of the existing channels in the multiplexer. In addition, any number of channels can be removed from an upstream position in a multiplexer relative to the remaining channels without affecting the performance of other channels in the multiplexer.

2. DESCRIPTION OF THE PRIOR ART

It is common for modern multichannel commercial communication spacecraft ground stations to combine a plurality of signals before the signal is transmitted to the spacecraft. One manner of combining such a plurality of signals is to use cascaded directional filters to form a non-contiguous multiplexing network. The design and properties of directional filters have been known for many years. In proceedings of the I.R.E., Volume 44, Number 8, August 1956, Pages 1018-1024, by S. B. Cohn and F. S. Coale, the use and design of directional channel separation filters is discussed. Where enough guard band exists between adjacent channels of this type of arrangement, no interaction will exist between the filters of adjacent channels when the channels are cascaded together. Consequently, each channel is a separate module which is able to be added or removed from the main chain without affecting the existing or remaining multiplexer. Unfortunately, when a multiplexer has an arrangment of contiguous channels relative to their operating frequencies, the guard bands between adjacent channels are insufficient or non-existent and strong interchannel interactions result. To solve this problem, it is common to construct two non-contiguous multiplexers adjacent to one another and to combine them using a 3 dB hybrid. Even though this arrangement results in a power loss of approximately fifty percent and has other requirements that make it extremely expensive to construct and to operate, these types of multiplexers are still widely used in ground stations on a worldwide basis. One reason for this widespread use is that this type of multiplexer allows total flexibility in adding channels at any time without any sacrifice in the performance of other channels.

In U.S. Pat. No. 4,029,902, issued on June 14th, 1977 to Bell, Jr. et al., entitled, "Contiguous Channel Multiplexer", an improved multiplexer is described whereby one or both of the preselected bandpass characteristics is extended past their associated band edges and into the reflective loss regions of the adjacent channel or channels. All channel filters use the same symmetrical filter design. Unfortunately, the multiplexer described in the Bell patent suffers from three disadvantages. Firstly, channels of the multiplexer must be arranged in either ascending or descending order of channel frequency. This does not constitute a problem for multiplexers used in spacecraft but is a very important limitation for multiplexers used for ground stations. Secondly, the multiplexing method causes asymmetry in the channel performance. With the present extensive use of a digital signal, for example, PSK or QPSK, channel asymmetry can reduce data rate and consequently can reduce revenue. Thirdly, channels cannot be added to or removed from existing multiplexer as asymmetries would then be introduced into the performance of adjacent channels, hence reducing their revenue earning capacity. However, the multiplexer described in the Bell patent does overcome the problem of the fifty percent power loss and the disadvantages generally apply only to the use of the multiplexer in a ground station.

In U.S. Pat. No. 4,258,435 issued to Ralph Levy et al. entitled "Manifold Multiplexer", there is described a multiplexer that provides minimum loss and minimum sizes, which are critical to spacecraft application. Unfortunately, the multiplexer described in the Levy patent is inflexible and relatively expensive, when compared to the present invention. The multiplexer described in the Levy patent is optimized and tuned as a complete unit and any change in the operating frequency and/or band width of a single channel will require a complete redesign of the entire multiplexer. This limitation is highly undesirable for multiplexers used in ground stations. The multiplexer described in the Levy patent also overcomes the problem of the fifty percent power loss.

With multiplexers used in spacecraft, the fact that channels cannot be added or removed from the multiplexer without redesigning the entire multiplexer, is not a serious limitation as changes cannot be made in the design once the spacecraft is launched in any event. Also, when a multiplexer is designed for use in a spacecraft, the number and relative frequencies of channels is known and there is no difficulty in designing the multiplexer so that the channels are arranged in either ascending or descending order of frequency. However, in multiplexers used in ground stations, a ground station owner may start with only two or three channels, for example, channels 1, 2 and 5. Subsequently, the ground station operator might be assigned a new channel, for example, channel 4, where consecutive channel numbers represent the operating frequency of each channel. The operator could be assigned this additional channel 4 because of growth achieved within the industry or because one of the existing channels is no longer available from the spacecraft and the new channel replaces the existing channel. With the multiplexers known in the prior art, channel 4 cannot be added to the arrangement of channels 1, 2 and 5 without redesigning and reconstructing the entire multiplexer. Of course, it may be necessary to add or remove additional channels on more than one occasion. If the multiplexer must be entirely redesigned each time, the cost of adding or removing channels to existing multiplexers can be prohibitive. Multiplexers used in ground stations are sometimes referred to as combiners. Ground stations usually do not have all of the channels that a satellite has but only a few nonconsecutive channels.

SUMMARY OF THE INVENTION

It is an object of the present invention to provide a modular multiplexer, where channels can be arranged in any random order of relative frequencies (ie. ascending, descending or mixed order) and channels can be removed or added without disturbing the operation of existing channels. It is a further object of the present invention to provide a multiplexer that is able to produce a substantially perfectly symmetrical passband loss variation and group delay performance for all channels.

A contiguous channel multiplexer has at least two channels that are contiguously multiplexed relative to their operating frequency. The multiplexer has an upstream end and a downstream end. Each channel has a module with two substantially identical filters that produce a response for said module. At least one module, that is contiguous with a downstream module, has filters that produce an asymmetrical filter function. The asymmetrical filter function combines with responses of other modules so that the multiplexer produces an overall symmetrical response.

Further, a method of constructing a contiguous channel multiplexer uses a multiplexer having at least two channels that are contiguously multiplexed relative to their operating frequency. Each channel has a module with two substantially identical filters. The method comprises choosing the filters of at least one module, that is contiguous with a downstream module, so that said filters produce an asymmetrical filter function and operating said multiplexer in such a way as to produce an overall symmetrical response.

BRIEF DESCRIPTION OF THE DRAWINGS

In the following drawings, there is shown the design and performance of some prior art multiplexers as well as an embodiment of the present invention.

DESCRIPTION OF A PREFERRED EMBODIMENT

In the following description, all channels with consecutive channel numbers are deemed to be contiguously located with respect to one another relative to their operating frequency.

Figure 5:
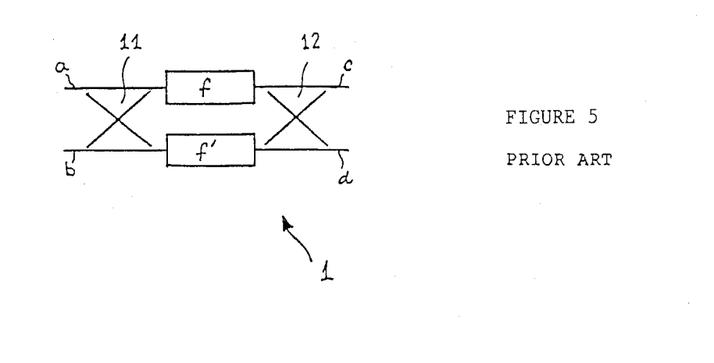
FIG. 5 is a schematic diagram of a prior art channel filter module having quadrature hybrid coupled directional filters.

In FIG. 5, there is shown a directional channel separation filter module 1. The module 1 is a basic building block of any hybrid coupled multiplexer and was suggested in the article by S. B. Cohn, et al., referred to above. Each filter module 1 consists of two quadrature hybrid couplers 11, 12, and two substantially identical bandpass filters f and f'. Such an arrangement has the following operational characteristics. If a signal enters port a, such that the signal is within the passband of filter f and f', the signal will emerge from port d. If an out-of-band signal enters port c, the signal will be reflected off the filter f, f' and will emerge from port d.

Figure 1:
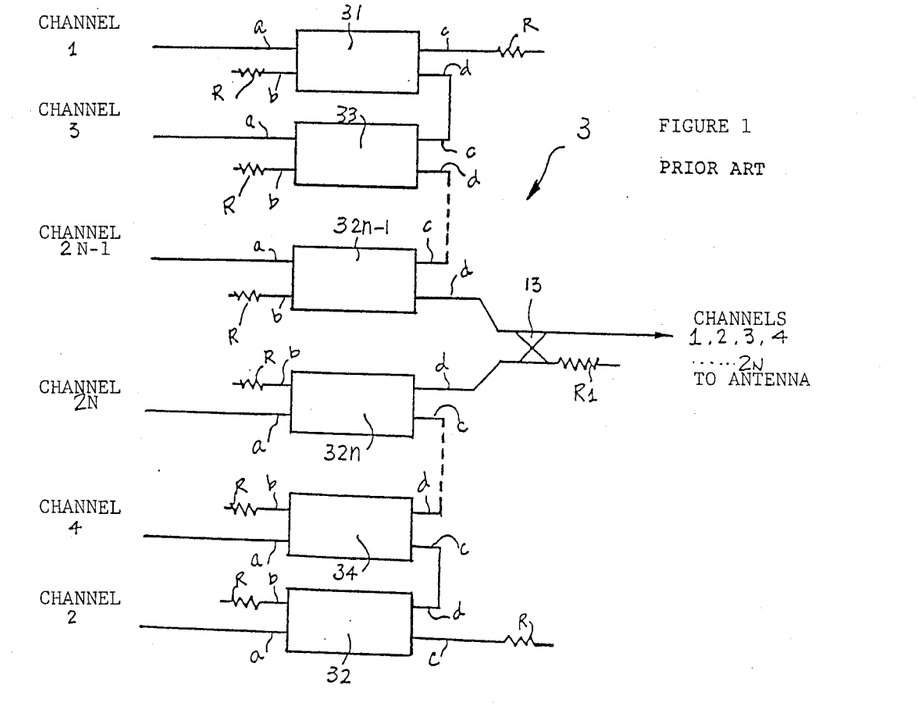
FIG. 1 is a block diagram of a prior art ground station contiguous channel multiplexer.

In FIG. 1, there is shown a block diagram of a conventional contiguous channel multiplexer of the type suggested by S. B. Cohn, et al. in the paper referred to above. In this arrangement, a multiplexer assembly 3 has filter modules, 31, 33, . . . 32n−1 that are cascaded together in an odd channel non-contiguous multiplexing sequence and filter modules 32, 34, . . . 32n, that are cascaded together in an even channel non-contiguous multiplexing sequence. In other words, this arrangement combines two separate non-contiguous multiplexers, one multiplexer having channels 1, 3, . . . 2n−1 and the other multiplexer having channels 2, 4, . . . 2n. If channels 1 and 2 or channels 3 and 4, etc. were included in the same multiplexer, strong inter-actions would occur between these contiguous channels, rendering the multiplexer unworkable. When a signal enters channel 1, port a of module 31, the signal emerges from port d and propagates towards port c of module 33. The signal is subsequently reflected off module 33 and emerges from port d of said module 33 before propagating toward port c of module 32n−1. One can readily see that signals entering ports a of each of channels 1, 3, . . . 2n−1 will subsequently noncontiguously combine and emerge together at port d of module 32n−1. All unused ports such as port c of module 31 and all ports b are determined by termination resistor R.

Similarly, all signals entering ports a of channels 2, 4, . . . 2n combine and emerge at port d of module 32n. To make a contiguous multiplexer out of these odd and even non-contiguous multiplexers, a quadrature hybrid 13 is commonly used to combine the two composite signals into one contiguous signal. Unfortunately, due to the two composite signals being non-coherent, fifty percent of the power will be dissipated into the high power termination R1. In other words, the use of the multiplexing technique, shown in FIG. 1 results in a fifty percent power loss. Nevertheless, this technique is the most widely used technique employed by commercial spacecraft ground station operators to achieve contiguous multiplexing. In using such a multiplexer technique, all filter modules in a given assembly will use identical filter functions, typically quasi-elliptic function filters with design bandwidths that are not extended into the passband of the next physically adjacent channel.

Figure 2:
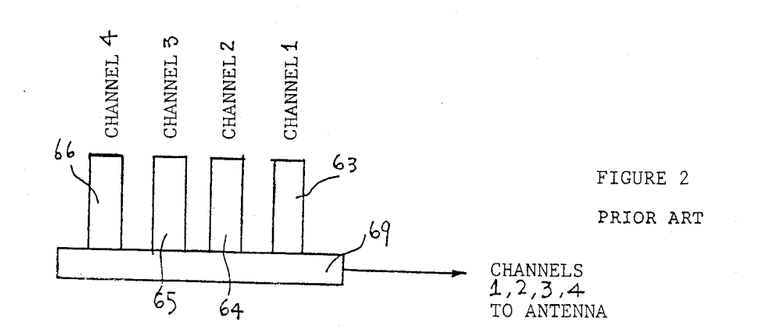
FIG. 2 is a block diagram of a prior art mainfold coupled contiguous channel multiplexer.

In FIG. 2, there is shown a prior art contiguous channel multiplexer, as proposed by R. Levy et al. in U.S. Pat. No. 4,258,435, that can combine any number of contiguous channels while avoiding the loss of fifty percent of the output power of the multiplexer assembly 3 of FIG. 1. In the multiplexing arrangement shown, filters, 63, 64, 65 and 66 are all connected to a common manifold 69 such that the signal at the output port of all 4 channels is combined into one composite signal. Although this type of multiplexer is optimal in terms of electrical performance and mechanical lightness and compactness, it suffers from a disadvantage in that it is not modular. It is not possible to remove or add a channel without affecting the performance of the other channels detrimentally, particularly those channels neighbouring in frequency (i.e. contiguous). The balance of mutual inter-action to provide best overall performance is achieved by precise location of the channel filter output on the manifold, the pattern of the allocation of channels to the filter along the manifold, and by precise electrical design of each filter. Thus, the entire multiplexer is tuned as a whole for best overall performance and, to add another channel or channels, or, to remove a channel or channels, would upset the balance upon which overall performance relies.

Figure 3:
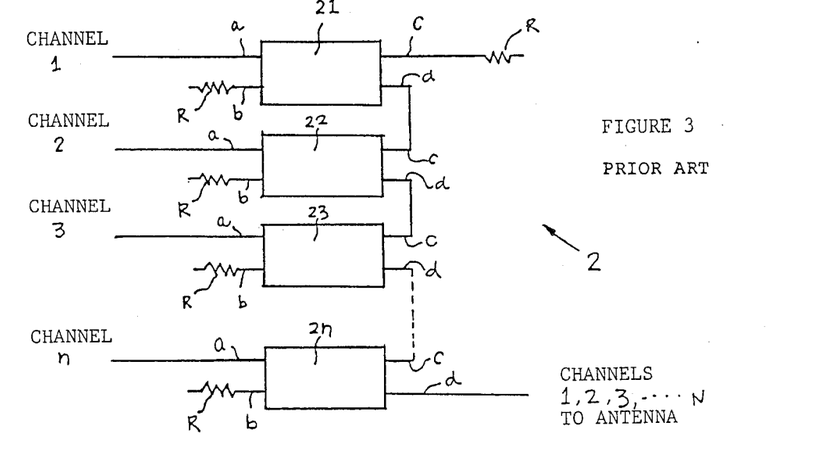
FIG. 3 is a block diagram of a prior art hybrid coupled channel multiplexer.
Figure 4A:
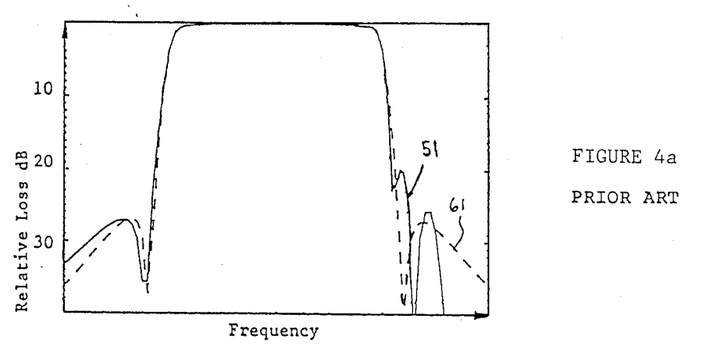
FIG. 4a is a graph showing a typical amplitude performance characteristic for a channel of the prior art multiplexer shown in FIG. 3.
Figure 4B:
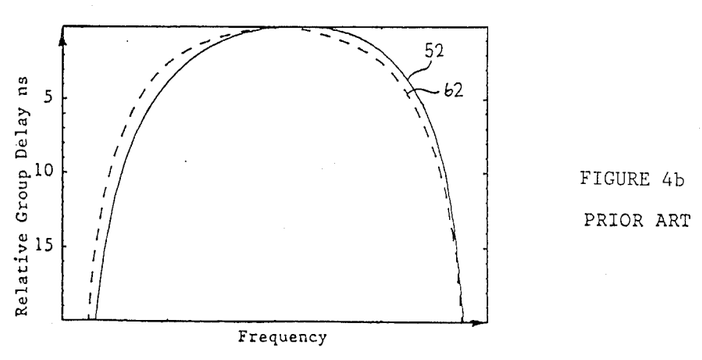
FIG. 4b a graph showing a typical group delay performance characteristic for a channel of the prior art multiplexer shown in FIG. 3.
Figure 4C:
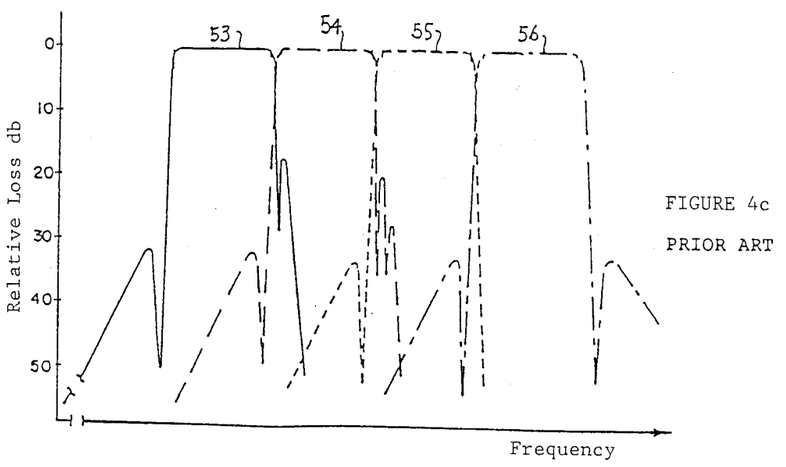
FIG. 4c is a graph showing overall performance characteristics of the prior art contiguous multiplexer shown in FIG. 3.

In FIG. 3, there is shown a prior art contiguous channel multiplexer 2, as suggested by C. Bell et al. in U.S. Pat. No. 4,029,902, using a series of directional channel separating filter modules 1. In this arrangement, filter modules 21, 22, 23, . . . 2n are cascaded to form a multiplexer assembly. The contiguously combined signal will emerge from port d of filter module 2n. Similar to the multiplexer assembly 3 of FIG. 1, all unused ports are terminated by termination R. The characteristics of this type of multiplexer are as follows. All channels are required to be cascaded in order of ascending or descending frequency, as illustrated in the multiplexer assembly 2 block diagram. Consequently, addition of a channel in arbitrary sequence to an existing assembly is not possible unless the channel to be added has a frequency that just happens to fit the established order of frequency of the existing multiplexer. The filter functions used in each filter module of a given multiplexer assembly are of the same type, resulting in distortion at the band-edge of the passband due to interaction of adjacent channels. In FIGS. 4a and 4b, curves 61 and 62 represent the ideal symmetric response that provide the optimal performance characteristics for a multiplexer 2 shown in FIG. 3. Curves 51 and 52 are typical channel performance characteristics achieved by a multiplexer 2. In FIG. 4c, there is shown an overall amplitude response characteristic of the prior art contiguous channel multiplexer 2 shown in FIG. 3. It can be seen that curves 53, 54, 55 and 56 all have quite different shape and all exhibit asymmetrical behaviour even though the filters of all modules are substantially identical to one another. Such asymmetry is undesirable for modern digital communication traffic which dominates today's telecommunications industry. This is the end of the description of the prior art multiplexers.

Figure 6A:
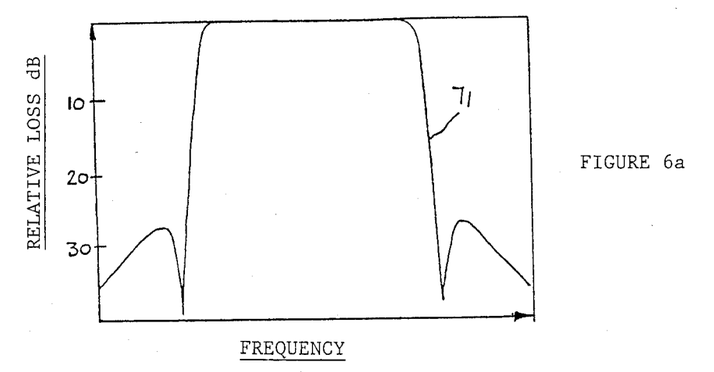
FIG. 6a is a graph showing amplitude characteristics of a filter module type 0 in accordance with the present invention.
Figure 6B:
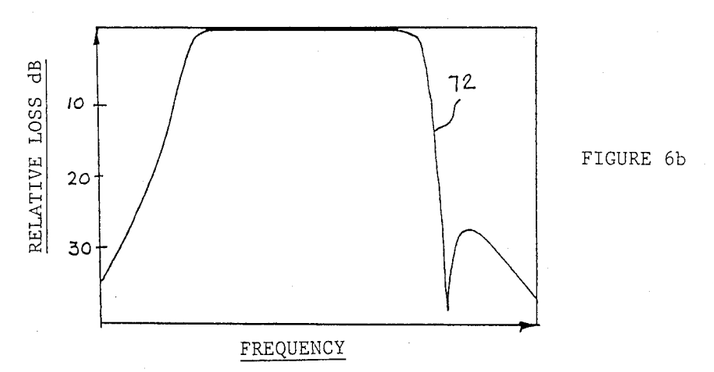
FIG. 6b is a graph showing amplitude characteristics of a filter module type 1 in accordance with the present invention.
Figure 6C:
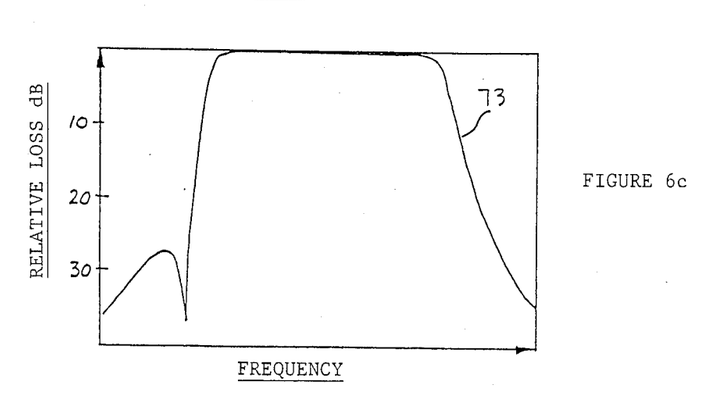
FIG. 6c is a graph showing amplitude characteristics of a filter module type 2 in accordance with the present invention.
Figure 6D:
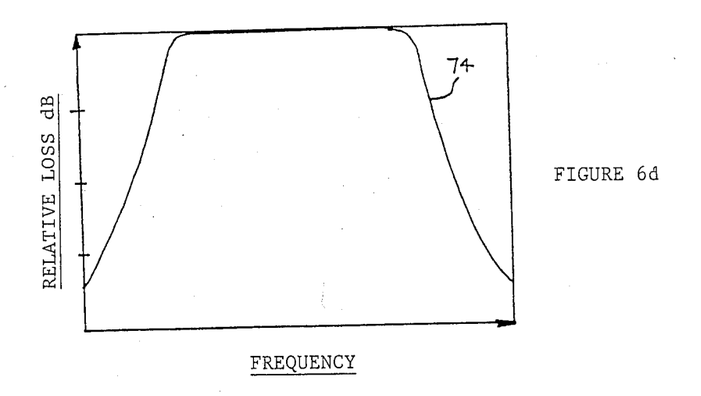
FIG. 6d is a graph showing amplitude characteristics of a filter module type 3 in accordance with the present invention.

Embodiments of the present invention will now be discussed using the same alpha numerals as used in FIGS. 1 to 5, inclusive, for those items that are the same or similar. In accordance with the present invention, the filter function used in filter module 1 for filters f and f' will be one of four different types. The use of each type of filter function will be determined by the multiplexing sequence and conditions. The reasons for choosing four different kinds of filter function is to provide complete band-edge performance compensation for all frequency multiplexing orders such that symmetrical channel characteristics will result regardless of multiplexing order. The amplitude characteristics of the four different types of filter function are illustrated in FIGS. 6a through 6d. Curve 71 of FIG. 6a represents a symmetrical elliptic/quasielliptic function response. Curve 72 of FIG. 6b represents an asymmetric elliptic/quasi-elliptic function response that has one transmission zero which is placed at the positive jw-axis. Curve 73 of FIG. 6c represents an asymmetric elliptic/quasi-elliptic function response that one transmission zero is being placed at the negative jw-axis. Finally, curve 74 of FIG. 6d represents a Chebyshev function response with no transmission zeros. Those skilled in the art will be able to readily implement all four filter functions shown and described.

Figure 7:
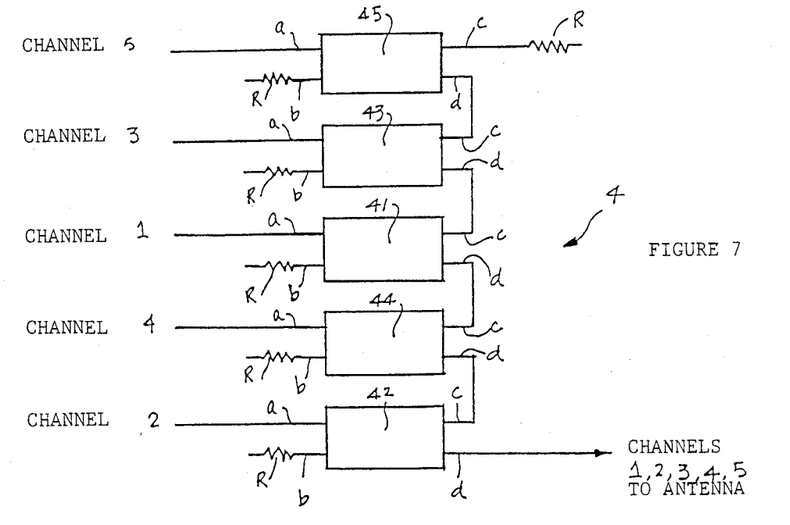
FIG. 7 is a block diagram of a present invention contiguous channel multiplexer multiplexed in a mixed channel frequency order.

FIG. 7 is a block diagram showing a contiguous channel multiplexer 4 having a multiplexing sequence that will utilize all four kinds of filter module shown in FIGS. 6a to 6d, inclusive in order to achieve an overall symmetrical response for the multiplexer 4. In said multiplexer 4, five filter modules 45, 43, 41, 44 and 42 are cascaded together in the illustrated order with respect to channel numbers 5, 3, 1, 4, 2 respectively. The objective of the multiplexer is to combine all five signals and have the combined signal emerge at port d of module 42 such that all channels exhibit an overall symmetric electrical passband characteristic. As with multiplexers 2, 3, all unused ports are determined by a termination R. In this disclosure, a channel is said to have a downstream channel, if port d of that channel filter module is connected to port c of another channel filter module. For example, all channels in multiplexer 4 have a downstream channel except channel 2. In other words, all channels will have a downstream channel except the channel that is last in the cascaded chain. Preferably, a multiplexer is designed so that the downstream end is the end nearest to an antenna for the multiplexer. In this way, channels can be added or removed from an upstream end of the multiplexer without disturbing the connection of the multiplexer to the antenna and the remaining parts of the multiplexer can continue to function. Of course, it would be possible to design a multiplexer so that the downstream end is the end opposite to the end where the antenna is connected. Based on the above definition of a downstream channel, the type of filter function to be selected for each channel by a given order of multiplexing frequency can be determined in accordance with the following criterian:

Module type 0; Symmetric filter function with one pair of transmission zeros as illustrated in FIG. 6a for the case where there are no contiguous downstream channels on both upper and lower bands of the said channel.

Module type 1; Asymmetric filter function with one transmission zero on the positive jw-axis as illustrated in FIG. 6b for the case where there is one continuous downstream channel on the lower band of the said channel.

Module type 2; Asymmetric filter function with one transmission zero on the negative jw-axis as illustrated in FIG. 6c for the case where there is one contiguous downstream channel on the upper band of the said channel.

Module type 3; Pure Chebyshev filter function with no transmission zeros on both upper and lower side as illustrated in FIG. 6d for the case where there are two contiguous downstream channels on both the lower and upper bands of the said channel.

The above module types 0 to 3, inclusive, set out optimum criteria for designing or constructing most multiplexers in accordance with the present invention. However, numerous variations can be made in the above module types within the scope of the attached claims. Generally, these variations will result in a small, but acceptable, sacrifice in performance of the multiplexer. However, for some multiplexers, these variations will result in the same performance or an improved performance over that obtainable with the specific module types set out above. Some of these variations will now be discussed in more detail. Concerning module type 0, where there are no contiguous downstream channels on both upper and lower bands of said channel, a module having a symmetric filter function with more than one pair of transmission zeros or no transmission zeros whatsoever could be used in place of the module having a symmetric filter function with one pair of transmission zeros. Concerning module type 1, where there is one contiguous downstream channel on the lower band of the said channel, a module having an asymmetric filter function with one more transmission zero on the positive jw-axis than on the negative jw-axis can generally be used in substitution for a module having an asymmetric filter function with one transmission zero on the positive jw-axis. Similarly, concerning module type 2, where there is one contiguous downstream channel on the upper band of said channel, a module having an asymmetric filter function with one more transmission zero in the negative jw-axis than on the positive jw-axis can generally be used in substitution for a module having an asymmetric filter function with one transmission zero on the negative jw-axis. Concerning module type 3, where there are two contiguous downstream channels on both the upper and lower bands of said channel, any module having a symmetrical filter function or a symmetrical filter function with one or more pairs of transmission zeros or a symmetrical filter function with no transmission zeros can generally be used in substitution for a module having a pure Chebyshev filter function with no transmission zeros. Numerous other variations will be readily apparent to those skilled in the art.

To further clarify the selection of module type for a given order of multiplexing frequency, the above module types 0, 1, 2, 3 can be redefined as a mathematical formula as follows:

Let the contiguous channels be numbered sequentially and ascending in frequency as follows, 1, 2, 3, ... n.

Module type T can be defined as follows:
if T=0 filter function is symmetrical elliptic
T=1 filter function is asymmetrical with +jw zero
T=2 filter function is asymmetrical with −jw zero
T=3 filter function is Chebyshev.

Function F(n,j) can be defined as follows:
F(n,j)=1 (When channel j exists downstream of channel n.); and
F(n,j)=0 (When channel j does not exist downstream of channel n.)

Then the filter module type Ti of channel i is given by:

$$T_i = 2F(i, i+1) + F(i, i-1).$$

Applying the above formula to the frequency arrangement of multiplexer 4 of FIG. 7, the filter function selected for each channel is as follows:

| Channel # | Module # | Module Type ($T_j$) | Downstream |
|---|---|---|---|
| 2 | 42 | 0 | ↑ |
| 4 | 44 | 0 | ↑ |
| 1 | 41 | 2 | ↑ |
| 3 | 43 | 3 | ↑ |
| 5 | 45 | 1 | ↑ |

Using the modular type as calculated from the above formula, FIGS. 8a through 8g illustrate the comparison of the ideal channel characteristic vs. filter module electrical characteristic before and after multiplexing. Throughout this series of graphs curves 61 and 62 are the ideal channel responses. Curves 81, 82, 83, 84, 85, 86, 87, 88 are the filter module characteristics before cascade in the sequence depicted in multiplexer 4 block diagram. Curves 71, 72, 73, 74, 75, 76, 77, 78 are the channel responses after all filter modules are cascaded according to the block diagram of multiplexer 4.

Figure 8A:
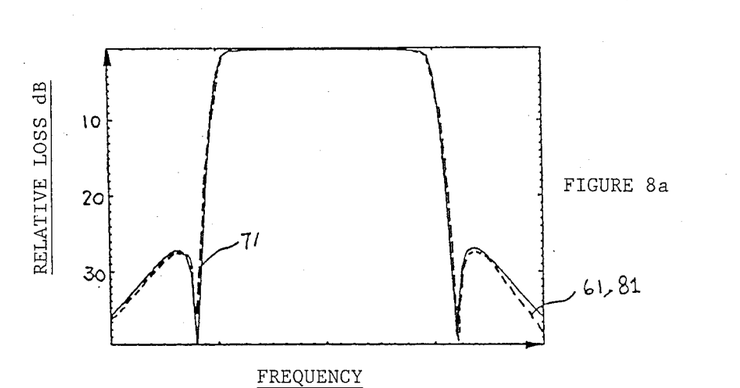
FIG. 8a is a graph showing amplitude characteristics of a channel moduler type 0 in accordance with the present before and after multiplexing.
Figure 8B:
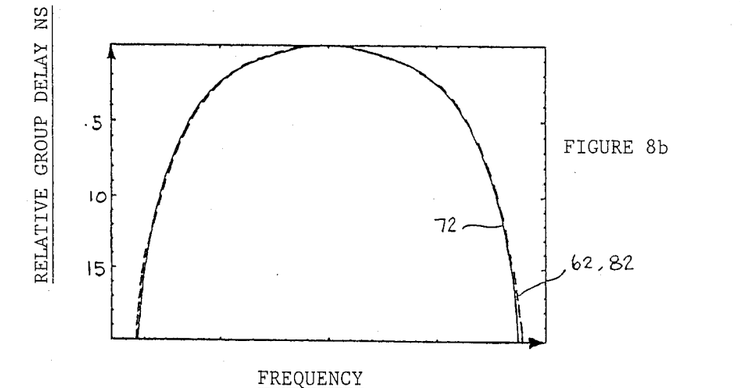
FIG. 8b is a graph showing group delay characteristics of a channel moduler type 0 in accordance with the present invention before and after multiplexing.
Figure 8C:
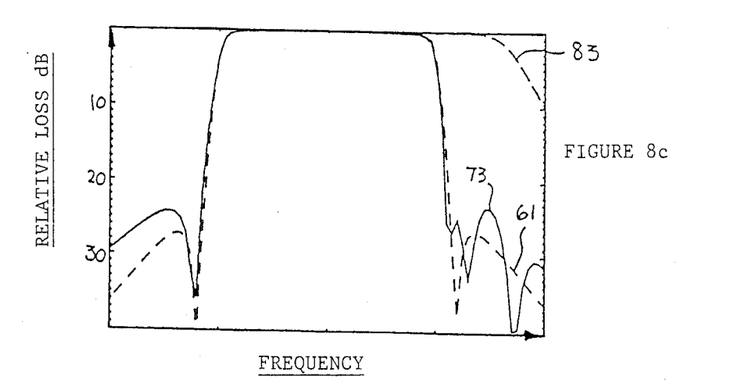
FIG. 8c is a graph showing amplitude characteristics of a channel moduler type 2 in accordance with the present before and after multiplexing.
Figure 8D:
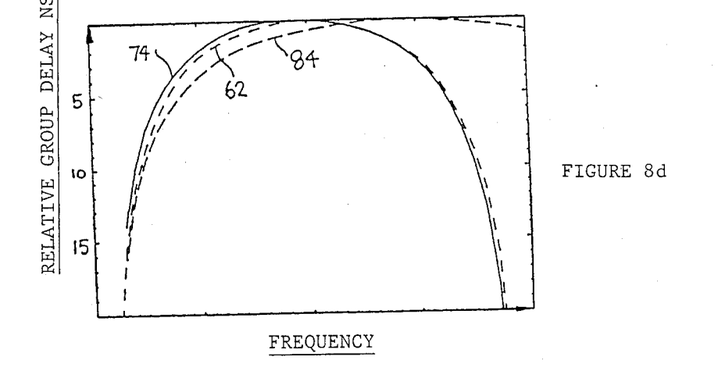
FIG. 8d is a graph showing group delay characteristics of a channel moduler type 2 in accordance with the present before and after multiplexing.
Figure 8E:
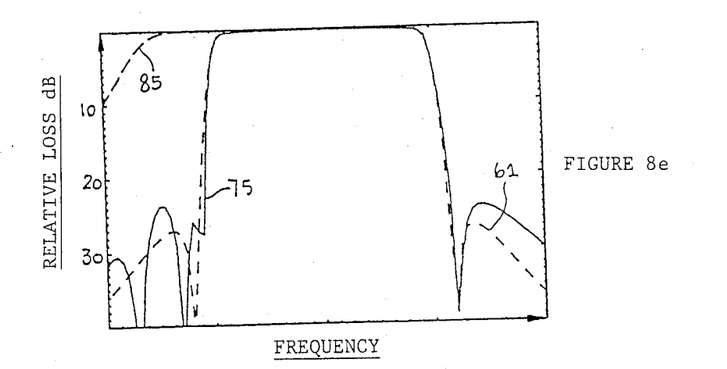
FIG. 8e is showing amplitude characteristics of a channel moduler type 1 in accordance with the present invention before and after multiplexing.
Figure 8F:
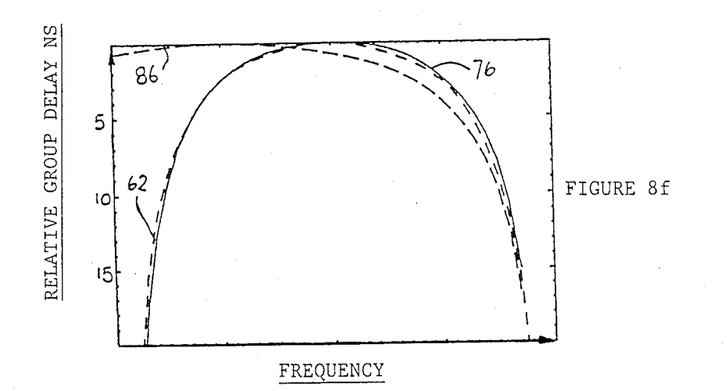
FIG. 8f is a graph showing group delay characteristics of a channel moduler type 1 in accordance with the present invention before and after multiplexing.
Figure 8G:
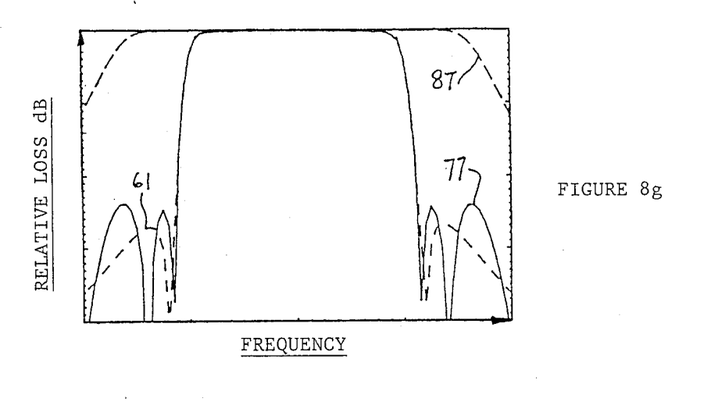
FIG. 8g is a graph showing amplitude characteristics of a channel moduler type 3 in accordance with the present invention before and after multiplexing.
Figure 8H:
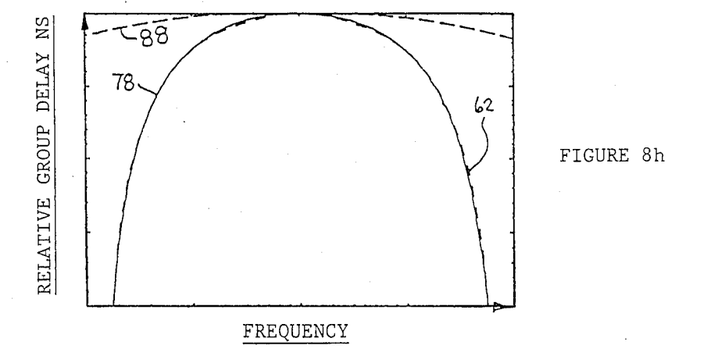
FIG. 8h is a graph showing group delay characteristics of a channel modular type 3 in accordance with the present invention before and after multiplexing.

In FIGS. 8a and 8b, the amplitude and group delay characteristics respectively of a channel module type 0 are shown. It can readily be seen that curves 71, 72, closely approach the ideal curves 61, 62 and that curves 81, 82 are virtually identical to the ideal. In FIGS. 8c and 8d, the amplitude and group delay characteristics respectively of a channel module type 2 are shown. It can readily be seen that the curves 73, 74, being the channel response after cascading is much closer to the ideal curves 61, 62 than the curves 83, 84, which are the filter module characteristics before cascading. In FIGS. 8e and 8f, the amplitude and group delay characteristics respectively of a channel module type 1 are shown. It can readily be seen that curves 75, 76 are much closer to ideal curves 61, 62 than curves 85, 86. In FIGS. 8g and 8h, the amplitude and group delay characteristics respectively of a channel module type 3 are shown. Again, it can readily be seen that curves 77, 78 are much closer to ideal curves 61, 62 respectively than curves 87, 88. In other words, the overall symmetric channel characteristic is greatly enhanced and is very close to the ideal response by cascading filter modules in accordance with the present invention.

Figure 9:
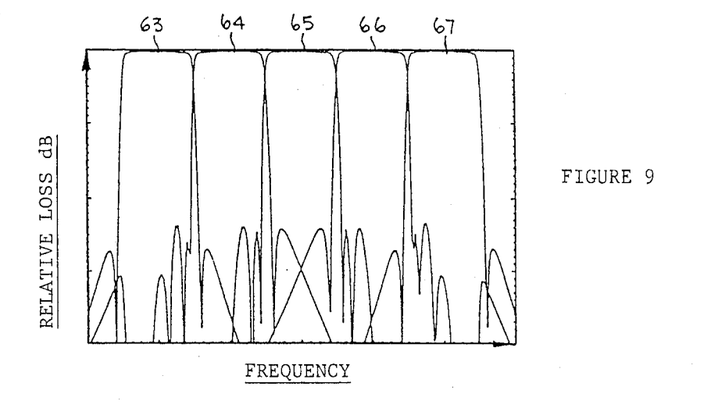
FIG. 9 is a graph showing overall performance characteristics of a contiguous channel multiplexer in accordance with the present invention.

In FIG. 9, the overall performance characteristics of the contiguous channel multiplexer 4 described in FIG. 7 is shown. Channels 2, 4, 1, 3, 5 have loss response curves 63, 64, 65, 66, 67 respectively. By comparing FIG. 9 with FIG. 4c, it can readily be seen that the overall response of the multiplexer 4 is relatively perfectly symmetrical whereas the response of the multiplexer 2 shown in FIG. 4c is not symmetrical and contains numerous distortions. With the multiplexer of the present invention, it is possible to use symmetric and asymmetric filter modules in combination in order to multiplex contiguous channels without any appreciable distortion. The multiplexer of the present invention utilizes filters that produce an asymmetrical filter function, yet the multiplexer can be operated in such a way as to produce an overall symmetric response.

In FIG. 7, one particular sequence of channels is described. However, an advantage of the multiplexer of the present invention is that any reasonable number of channels can be arranged in random order with respect to frequency. Also, an additional channel or channels of any preferred frequency can be added at any time to an existing multiplexer so long as the additional channel or channels are inserted into the multiplexer in an upstream position relative to the existing channels, without being concerned with the frequency of the channel being added relative to the frequency of the existing channels and without disturbing the performance of the existing channels. Similarly, any existing channel that is located upstream of all other channels can be removed from the multiplexer at any time without disturbing the performance of the remaining channels of the existing multiplexer.

As with the prior art module described in FIG. 5, each filter of the multiplexer of the present invention has an input port and an output port, the inputs of the two filters in each module being interconnected by quadrative hybrid couplers and the output ports of the two filters in each module being interconnected by quadrative hybrid couplers. The modules contain appropriate impedances, for example, all unused ports are determined by a termination R.

In a method of constructing a contiguous channel multiplexer, the multiplexer has at least two channels that are contiguously multiplexed relative to their operating frequency and each channel has a module with two substantially identical filters. The method involves choosing the filters of at least one module, that is contiguous with a downstream module, so that said filters produce an asymmetrical filter function and operate in said multiplexer in such a way as to produce an overall symmetrical response. Preferably, each filter has an input port and an output port, the input ports of the two filters in each module being interconnected by quadrative hybrid couplers and the output ports of the filters of each module being interconnected by quadrative hybrid couplers. Still more preferably, the method involves choosing the most downstream channel first, then choosing sequentially the channel immediately upstream of the channel last chosen, and choosing the substantially identical filters of each module and sequence so that:

(i) any channel that does not have a contiguous downstream channel has filters that produce a symmetrical filter function with one pair of transmission zeros;

(ii) any channel that has one contiguous downstream channel on the lower band of said channel has filters that produce an asymmetrical filter function with one transmission zero on the positive jw-axis;

(iii) any channel that has one contiguous downstream channel on the upper band of said channel contains filters that produce an asymmetrical filter function with one transmission zero on the negative jw-axis; and (iv) any channel that has two contiguous downstream channels on both the lower and upper bands of said channel has filters that produce a pure Chebyshev filter function with no transmission zeros.

A method for adding a new channel or channels involves adding any channels of any preferred frequency to the multiplexer by inserting said additional channels in an upstream position relative to the existing channels of said multiplexer. Similarly, a method for removing a channel or channels from the multiplexer involves removing any channel or channels that are in an upstream position relative to the remaining channels of said multiplexer.

In the following examples, there are discussed numerous other arrangements of channels in accordance with the present invention. The channels are chosen in accordance with the method of the present invention and utilize the formula set out in the description. As one becomes more acquainted with the present invention, it will be discovered that it is not necessary to actually use the formula but to simply apply the design criterion for each module type as set out in the disclosure.

EXAMPLE 1

| Channel # | Module # | Module Type ($T_i$) | Downstream |
|---|---|---|---|
| 3 | 1 | 0 | ↑ |
| 2 | 2 | 2 | ↑ |
| 1 | 3 | 2 | ↑ |
| 4 | 4 | 1 | ↑ |

In this example, the multiplexer could initially have been constructed with only channels 2 and 3. Then, channel 1 could have been added subsequently and channel 4 later yet. Similarly, by reversing the procedure, channel 4 could be removed from the multiplexer without affecting the performance of the remaining channels. Channel 1 could be removed at the same time as channel 4 or removed at a subsequent time.

EXAMPLE 2

| Channel # | Module # | Module Type ($T_i$) | Downstream |
|---|---|---|---|
| 2 | 1 | 0 | ↑ |
| 1 | 2 | 2 | ↑ |
| 4 | 3 | 0 | ↑ |
| 3 | 4 | 3 | ↑ |
| 5 | 5 | 1 | ↑ |

In this example, a ground station operator could have initially constructed channels 1 and 2 in accordance with the present invention. Later on, channels 4, 3 and 5 could be added simultaneously or one after another, each in an upstream position. Similarly, these channels could be removed together or one at a time by removing channel 5 first, channel 3 second and channel 4 third.

EXAMPLE 3

| Channel # | Module # | Module Type ($T_i$) | Downstream |
|---|---|---|---|
| 4 | 1 | 0 | ↑ |
| 2 | 2 | 0 | ↑ |
| 1 | 3 | 2 | ↑ |

-continued

| Channel # | Module # | Module Type ($T_i$) | Downstream |
|---|---|---|---|
| 3 | 4 | 3 | ↑ |
| 5 | 5 | 1 | ↑ |

In this example, a ground station operator could originally have constructed channels 1, 2, 4 with channel 4 being downstream and channel 1 by upstream. Subsequently, channels 3 and 5 could be added in the upstream position. Also, as previously discussed, channels 5 and 3 and even channel 1 could be removed simultaneously or sequentially as long as the channels being removed are in an upstream position relative to the remaining channels.

EXAMPLE 4

| Channel # | Module # | Module Type ($T_i$) | Downstream |
|---|---|---|---|
| 4 | 1 | 0 | ↑ |
| 3 | 2 | 2 | ↑ |
| 2 | 3 | 3 | ↑ |
| 5 | 4 | 1 | ↑ |
| 1 | 5 | 2 | ↑ |
| 7 | 6 | 0 | ↑ |
| 6 | 7 | 3 | ↑ |

In this example, the multiplexer could originally have been constructed in accordance with the present invention with channels 2, 3 and 4. Later on, channel 5 could have been added, followed by channels 1, 7 and 6, in that order. As with the other examples, any number of channels could also be removed as long as the channels removed are in an upstream position relative to the remaining channels.

From the examples, the importance of initially designing a multiplexer in accordance with the present invention can readily be seen as it is possible to add virtually any number of channels in any random order as long as each channel being added is added in an upstream position relative to the existing channels. Similarly, any channels can be removed at any time as long as the channels removed are in an upstream position relative to the remaining channels. In addition, the response characteristics of the present invention are an improvement over those achieved by some of the prior art multiplexers. While examples have been given of particular arrangements of channels, the description is not intended to be restricted in any way and virtually any arrangement of any reasonable number of channels could be utilized.

What I claim as my invention is:

1. A contiguous channel multiplexer comprising at least two channels that are contiguously multiplexed relative to their operating frequency, said multiplexer having an upstream end and a downstream end, each channel having a module with two substantially identical filters that produce a response for said module, at least one module that is contiguous with one downstream module having filters that produce an asymmetrical filter function, said asymmetrical filter function combining with responses of other modules so that said multiplexer produces an overall symmetrical response.

2. A multiplexer as claimed in claim 1 wherein any channel that has no contiguous downstream channels on both upper and lower bands of said channel has a module with filters that produce a symmetrical filter function.

3. A multiplexer as claimed in claim 1 wherein any channel that has no contiguous downstream channels on both upper and lower bands of said channel has a module with filters that produce a symmetrical filter function with at least one pair of transmission zeros.

4. A multiplexer as claimed in claim 1 wherein any channel that has no contiguous downstream channels on both upper and lower bands of said channel has a module with filters that produce a symmetrical filter function with one pair of transmission zeros.

5. A multiplexer as claimed in any one of claims 2, 3 or 4 wherein any channel that has one contiguous downstream channel on a lower band of said channel has a module with filters that produce an asymmetrical filter function with one more transmission zero on a positive jw-axis than on a negative jw-axis.

6. A multiplexer as claimed in claim 4 wherein any channel that has one contiguous downstream channel on a lower band of said channel has a module with filters that produce an asymmetrical filter function with one transmission zero on a positive jw-axis.

7. A multiplexer as claimed in any one of claims 2, 3 or 6 wherein any channel that has one contiguous downstream channel on an upper band of said channel contains a module with filters that produce an asymmetrical filter function with one more transmission zero on a negative jw-axis than on a positive jw-axis.

8. A multiplexer as claimed in claim 6 wherein any channel that has one contiguous downstream channel on an upper band of said channel contains a module with filters that produce an asymmetrical filter function with one transmission zero on a negative jw-axis.

9. A multiplexer as claimed in any one of claims 2, 6 or 8 wherein any channel that has two contiguous downstream channels on both lower and upper bands of said channel has a module with filters that produce a symmetrical filter function.

10. A multiplexer as claimed in any one of claims 2, 6 or 8 wherein any channel that has two contiguous downstream channels on both upper and lower bands of said channel has a module with filters that produce a symmetrical filter function with at least one pair of transmission zeros.

11. A multiplexer as claimed in any one of claims 2, 6 or 8 wherein any channel that has two contiguous downstream channels on both upper and lower bands of said channel has a module with filters that produce a symmetrical filter function with no transmission zeros.

12. A multiplexer as claimed in claim 8 wherein any channel that has two contiguous downstream channels on both upper and lower bands of said channel has a module with filters that produce a pure Chebyshev filter function with no transmission zeros.

13. A multiplexer as claimed in claim 12 wherein the multiplexer has any reasonable number of channels arranged in random order with respect to frequency.

14. A multiplexer as claimed in claim 12 wherein an additional channel of any preferred frequency can be added at any time to the multiplexer so long as said additional channel is inserted into the multiplexer in an upstream position relative to the existing channels of the multiplexer, without being concerned with the frequency of the channel being added relative to the frequency of existing channels and without disturbing the performance or arrangement of existing channels of the multiplexer, said additional channel having a module with two substantially identical filters, said additional channel satisfying the same criterion as existing channels.

15. A multiplexer as claimed in claim 12 wherein a plurality of additional channels of any preferred frequency can be added at any time to the multiplexer so long as said additional channels are each inserted into the multiplexer in an upstream position relative to the existing channels of the multiplexer, without being concerned with the frequency of the channel being added to relative to the frequency of existing channels and without disturbing the performance or arrangement of existing channels of the multiplexer, said additional channels each having a module with two substantially identical filters, said additional channels each satisfying the same criterion as existing channels.

16. A multiplexer as claimed in claim 12 wherein any existing channel that is located upstream of all other channels can be removed from the multiplexer without disturbing the performance or arrangement of the remaining channels of the existing multiplexer.

17. A multiplexer as claimed in any one of claims 1, 12 or 14 wherein each filter has an input port and an output port, the inputs of the two filters in each module being interconnected by quadrative hybrid couplers, the output ports of the two filters in each module being interconnected by quadrative hybrid couplers, said modules containing appropriate impedances.

18. A method of constructing a contiguous channel multiplexer, said multiplexer having at least two channels that are contiguously multiplexer relative to their operating frequency, said multiplexer having an upstream end and a downstream end, each channel having a module with two substantially identical filters, each filter having an input port and an output port, the input ports of the two filters in each module being interconnected by quadrative hybrid couplers, the output ports of the two filters of each module being interconnected by quadrative hybrid couplers, said method comprising choosing the most downstream channel first, then choosing sequentially the channel immediately upstream of the channel last chosen, and choosing the substantially identical filters for each module in sequence so that:
  (i) any channel that does not have a contiguous downstream channel has filters that produce a symmetrical filter function with one pair of transmission zeros;
  (ii) any channel that has one contiguous downstream channel on the lower band of said channel has filters that produce an asymmetrical filter function with one transmission zero on a positive jw-axis;
  (iii) any channel that has one contiguous downstream channel on the upper band of said channel contains filters that produce an asymmetrical filter function with one transmission zero on a negative jw-axis;
  (iv) any channel that has two contiguous downstream channels on both the lower and upper bands of said channel has filters that produce a pure Chebyshev filter function with no transmission zeros.

19. A method as claimed in claim 18 including the steps of adding an additional channel of any preferred frequency to said multiplexer by adding said additional channel in an upstream position relative to the existing channels of said multiplexer, said additional channel having a module with two substantially identical filters, choosing the substantially identical filters for the module of said additional channels so that said channels satisfy the same criterion as existing channels.

20. A method as claimed in claim 18 wherein any channel is removed from an existing multiplexer by removing the channel from an upstream position relative to the remaining channels of said multiplexer.

21. A method of constructing a contiguous channel multiplexer, said multiplexer having at least two channels that are contiguously multiplexed relative to their operating frequency, each channel having a module with two substantially identical filters that produce a response for said module, said method comprising choosing the filters for at least one module that is contiguous with one downstream module so that said filters produce an asymmetrical filter function, and combining the responses of all said modules so as to produce an overall symmetrical response for said multiplexer.

22. A method as claimed in claim 21 wherein the method comprises choosing the most downstream channel first, then choosing sequentially the channel immediately upstream of the channel last chosen, choosing the substantially identical filters for each module in sequence so that:
  (i) any channel that does not have a contiguous downstream channel has filters that produce a symmetrical filter function with at least one pair of transmission zeros;
  (ii) any channel that has one contiguous downstream channel on the lower band of said channel has filters that produce an asymmetrical filter function with one more transmission zero on a positive jw-axis than on a negative jw-axis;
  (iii) any channel that has one contiguous downstream channel on the upper band of said channel contains filters that produce an asymmetrical filter function with one or more transmission zero on a negative jw-axis than on a positive jw-axis; and
  (iv) any channel that has two contiguous downstream channels on both the lower and upper bands of said channel has filters that produce a symmetrical filter function.

23. A method as claimed in claim 21 wherein the method comprises choosing the most downstream channel first, then choosing sequentially the channel immediately upstream of the channel last chosen, and choosing the substantially identical filters for each module in sequence so that:
  (i) any channel that does not have a contiguous downstream channel has filters that produce a symmetrical filter function with one pair of transmission zeros;
  (ii) any channel that has one contiguous downstream channel on the lower band of said channel has filters that produce an asymmetrical filter function with one transmission zero on a positive jw-axis;
  (iii) any channel that has one contiguous downstream channel on the upper band of said channel contains filters that produce an asymmetrical filter function with one transmission zero on a negative jw-axis; and
  (iv) any channel that has two contiguous downstream channels on both the lower and upper bands of said channel has filters that produce a pure Chebyshev filter function with no transmission zeros.

24. A method as claimed in any one of claims 21, 22 or 23 wherein the method comprises adding any additional channel of any preferred frequency to said multiplexer by inserting said additional channel in an upstream position relative to the existing channels of said multiplexer, each additional channel having a module with two substantially identical filters, choosing the additional channels by applying the same criterian as that used for existing channels.

25. A method as claimed in any one of claims 21, 22 or 23 said method comprising removing any channel from the multiplexer by removing the channel that is in an upstream position relative to remaining channels of said multiplexer.

* * * * *